US009467261B2

(12) United States Patent
Papasakellariou et al.

(10) Patent No.: US 9,467,261 B2
(45) Date of Patent: Oct. 11, 2016

(54) SYSTEM AND METHOD FOR RESOURCE MAPPING FOR COVERAGE ENHANCEMENTS OF BROADCAST CHANNELS

(71) Applicant: Samsung Electronics Co., Ltd., Suwon-si, Gyeonggi-do (KR)

(72) Inventors: Aris Papasakellariou, Houston, TX (US); Jianzhong Zhang, Plano, TX (US); Ying Li, Richardson, TX (US); Boon Loong Ng, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 14/490,452

(22) Filed: Sep. 18, 2014

(65) Prior Publication Data

US 2015/0085795 A1 Mar. 26, 2015

Related U.S. Application Data

(60) Provisional application No. 61/882,483, filed on Sep. 25, 2013.

(51) Int. Cl.
*H04L 5/00* (2006.01)

(52) U.S. Cl.
CPC ............ *H04L 5/0044* (2013.01); *H04L 5/006* (2013.01); *H04L 5/0007* (2013.01)

(58) Field of Classification Search
CPC .................................................. H04L 5/0044
See application file for complete search history.

(56) References Cited

U.S. PATENT DOCUMENTS

2011/0075750 A1* 3/2011 Miki ..................... H04W 48/10
375/260
2013/0121249 A1 5/2013 Ji et al.

OTHER PUBLICATIONS

International Search Report in connection with Korean application PCT/KR2014/008983, dated Dec. 18, 2014, 3 pages.
Written Opinion of the International Searching Authority in connection with Korean application PCT/KR2014/008983, dated Dec. 18, 2014, 6 pages.
LG Electronics, "Discussions on PBCH coverage enhancement for MTC", 3GPP TSG RAN WG1 Meeting #74, R1-133371, Aug. 19-23, 2013, Barcelona, Spain, 5 pages.
Fujitsu, "MTC PBCH Limitations", 3GPP TSG-RAN WG1 Meeting #74, R1-133129, Aug. 19-23, 2013, Barcelona, Spain, 3 pages.
ZTE, "Physical Broadcast Channel Coverage Enhancement", 3GPP TSG RAN WG1 Meeting #74, R1-133059, Aug. 19-23, 2013, Barcelona, Spain, 4 pages.
ITRI, "PBCH Coverage Extension for MTC Devices", 3GPP TSG RAN WG1 Meeting #73, R-132256, May 20-24, 2013, Fukuoka, Japan, 3 pages.
3GPP TS 36.211 v11.2.0, "E-UTRA, Physical channels and modulation"; (Apr. 2013); 111 pages.
3GPP TS 36.212 v11.2.0, "E-UTRA, Multiplexing and Channel coding"; (Apr. 2013); 84 pages.
3GPP TS 36.213 v11.2.0, "E-UTRA, Physical Layer Procedures"; (Apr. 2013); 175 pages.
3GPP TS 36.321 v11.2.0, "E-UTRA, Medium Access Control (MAC) protocol specification"; (Apr. 2013); 58 pages.
3GPP TS 36.331 v11.2.0, "E-UTRA, Radio Resource Control (RRC) Protocol Specification"; (Feb. 2013); 345 pages.

\* cited by examiner

*Primary Examiner* — Dang Ton
*Assistant Examiner* — Kevin Lee

(57) ABSTRACT

Methods and apparatus are provided for a base station to transmit repetitions of broadcast information and for a UE to detect the broadcast information. In a first method, the base station maps each repetition in a respective quadruple of subframe symbols while accounting for a possible different number of available sub-carriers among quadruplets of subframe symbols. In a second method, the base station maps the repetitions successively in available sub-carriers. For intermittent transmissions of repetitions, the UE can use the mapping structure of the repeated broadcast information to determine an existence of a transmission.

20 Claims, 10 Drawing Sheets

US 9,467,261 B2

SYSTEM AND METHOD FOR RESOURCE MAPPING FOR COVERAGE ENHANCEMENTS OF BROADCAST CHANNELS

CROSS-REFERENCE TO RELATED APPLICATION AND CLAIM OF PRIORITY

The present application claims priority under 35 U.S.C. §119(e) to: U.S. Provisional Patent Application Ser. No. 61/882,483 filed Sep. 25, 2013, entitled "RESOURCE MAPPING FOR REPETITIONS OF BROADCAST SYSTEM INFORMATION." The contents of the above-identified patent document are incorporated herein by reference.

TECHNICAL FIELD

The present application relates generally to wireless communications and, more specifically, to resource mappings for coverage enhancements of broadcast signaling.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to provide resource mapping for coverage enhancements of broadcast signaling.

In a first embodiment, a method includes mapping, by a base station, repetitions for a transmission of a broadcast channel in a number of Sub-Frame (SF) symbols over one or more SFs of a frame that includes ten SFs and in a number of sub-carriers of a bandwidth for each SF symbol of the number of SF symbols. At least one repetition is mapped onto a subset of the number of sub-carriers in a SF symbol and one repetition is a partial repetition. The method additionally includes transmitting, by the base station to a UE, the repetitions for the broadcast channel.

In a second embodiment, a method includes mapping, by a base station, repetitions for a transmission of a broadcast channel in a number of Sub-Frame (SF) symbols over one or more SFs of a frame that includes ten SFs and in a number of sub-carriers of a bandwidth for each SF symbol in the number of SF symbols. The number of sub-carriers includes a set of sub-carriers the base station also uses to map a Channel State Information Reference Signal (CSI-RS). The method additionally includes transmitting, by the base station to a UE, the repetitions for the broadcast channel.

In a third embodiment, a method includes receiving, by a User Equipment (UE), signaling that the UE assumes to convey repetitions for a transmission of a broadcast channel in a number of Sub-Frame (SF) symbols over one or more SFs of a frame that includes ten SFs and in a number of sub-carriers of a bandwidth for each SF symbol in the number of SF symbols. The method additionally includes correlating, by the UE, element-wise sub-carriers of a first received signaling corresponding to a first assumed repetition with sub-carriers of a second signaling corresponding to a second assumed repetition. The method also includes accumulating, by the UE, the correlation values to obtain a sum value. The method further includes computing, by the UE, a magnitude of the sum value. The method additionally includes determining, by the UE, whether repetitions for the broadcast channel exist in the received signaling depending on whether the magnitude is larger than a threshold.

In a fourth embodiment, a base station includes a mapper and a transmitter. The mapper is configured to map repetitions for a transmission of a broadcast channel in a number of Sub-Frame (SF) symbols over one or more SFs of a frame that includes ten SFs and in a number of sub-carriers of a bandwidth for each SF symbol of the number of SF symbols. At least one repetition is mapped onto a subset of the number of sub-carriers in a SF symbol and one repetition is a partial repetition. The transmitter is configured to transmit the repetitions for the broadcast channel.

In a fifth embodiment, a User Equipment (UE) includes a receiver, and a mapper. The receiver configured to receive repetitions for a transmission of a broadcast channel. The mapper configured to map repetitions of the broadcast channel in a number of Sub-Frame (SF) symbols over one or more SFs of a frame that includes ten SFs and in a number of sub-carriers of a bandwidth for each SF symbol of the number of SF symbols, wherein at least one repetition is mapped onto a subset of the number of sub-carriers in a SF symbol and one repetition is a partial repetition.

In a sixth embodiment, a User Equipment (UE) includes a receiver, a correlator, an accumulator, a computing unit, and a decision unit. The receiver is configured to receive signaling that the UE assumes to convey repetitions for a transmission of a broadcast channel in a number of Sub-Frame (SF) symbols over one or more SFs of a frame that includes ten SFs and in a number of sub-carriers of a bandwidth for each SF symbol in the number of SF symbols. The correlator is configured to element-wise correlate sub-carriers of a first received signaling corresponding to a first assumed repetition with sub-carriers of a second signaling corresponding to a second assumed repetition. The accumulator is configured to accumulate the correlation values to obtain a sum value. The computing unit is configured to compute a magnitude for the sum value. The decision unit configured to decide whether repetitions for the broadcast channel exist in the received signaling depending on whether the magnitude is larger than a threshold.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TS 36.321 v11.2.0, "E-UIRA, Medium Access Control (MAC) protocol specification" (REF 4); and 3GPP TS 36.331 v11.2.0, "E-UTRA, Radio Resource Control (RRC) Protocol Specification" (REF 5).

This disclosure relates to resource mapping for coverage enhancements of broadcast signaling. A wireless communication network includes a DownLink (DL) that conveys signals from transmission points, such as base stations or enhanced NodeBs (eNBs), to UEs. The wireless communication network also includes an UpLink (UL) that conveys signals from UEs to reception points, such as eNBs.

Figure 1:
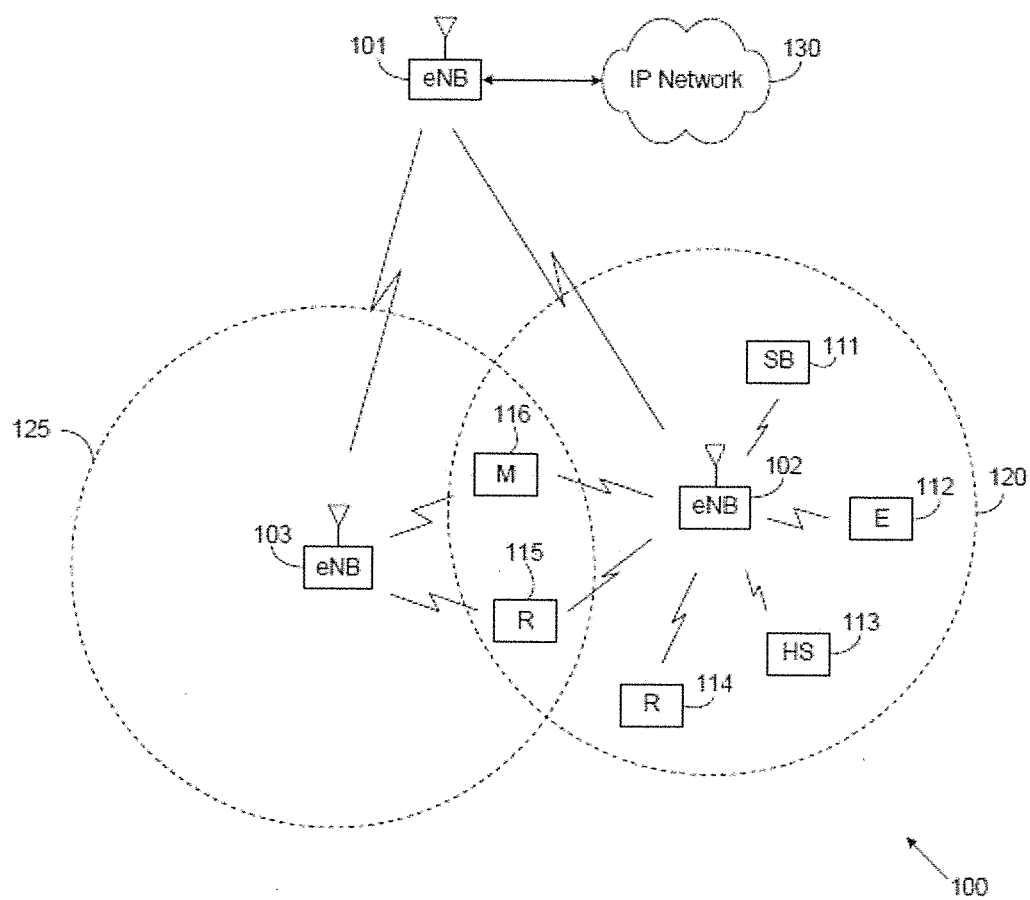
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide coverage enhancement for broadcast signaling.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
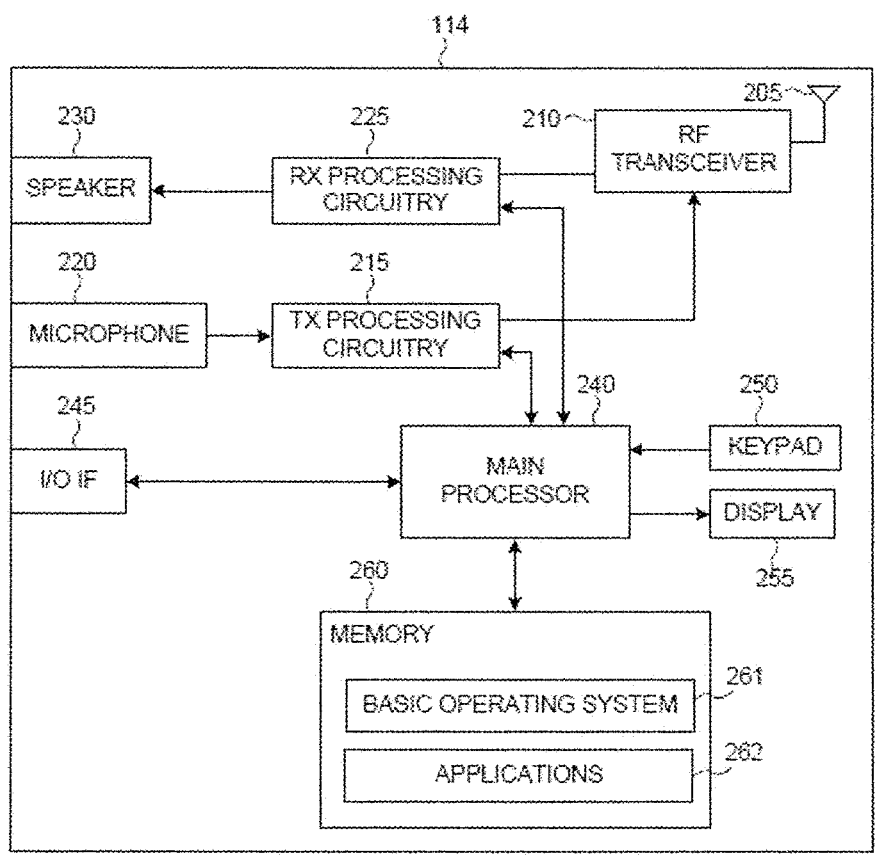
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a broadcast signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support broadcast signaling in a normal mode or in an enhanced coverage mode.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
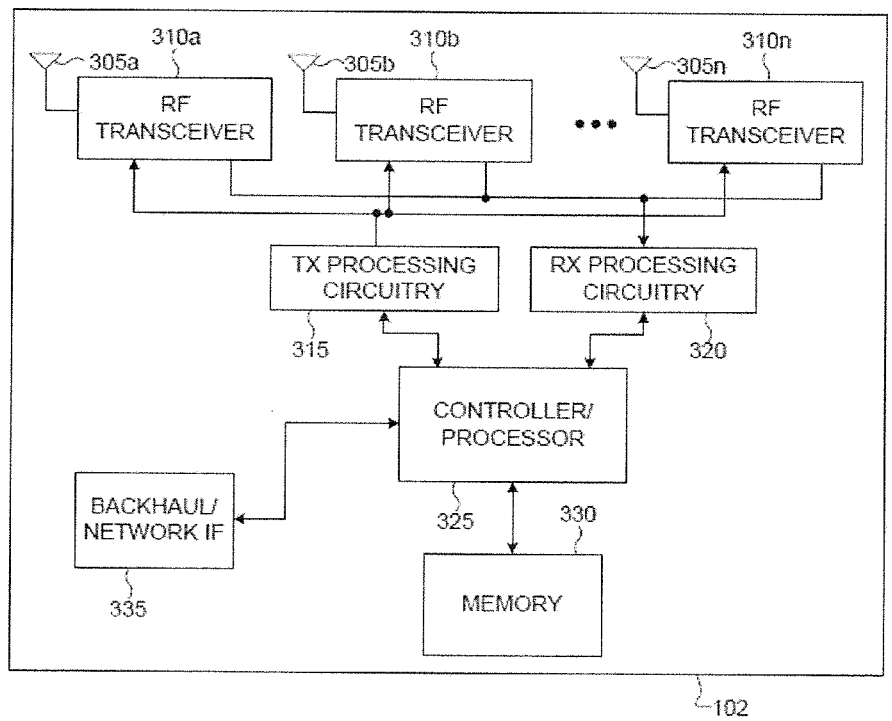
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support broadcast signaling in a normal mode or in an enhanced coverage mode.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. DL signals can be transmitted using Orthogonal Frequency Division Multiplexing (OFDM). An eNB, such as eNB 102, can transmit data information or DCI through respective Physical DL Shared CHannels (PDSCHs) or Physical DL Control CHannels (PDCCHs) or Enhanced PDCCHs (EPDCCHs)—see also REF 1. The eNB, such as eNB 102, can transmit one or more of multiple types of RS, including a UE-Common RS (CRS), a Channel State Information RS (CSI-RS), and a DeModulation RS (DMRS)—see also REF 1. A CRS can be transmitted over a DL system BandWidth (BW) and can be used by UEs, such as UE 114 or UE 116, to demodulate data or control signals or to perform measurements. To reduce CRS overhead, eNB 102 can transmit a CSI-RS with a smaller density in the time or frequency domain than a CRS. For Interference Measurements (IMs), CSI-IM resources associated with a Zero Power CSI-RS (ZP CSI-RS) can be used. A UE, such as UE 114 or UE 116, can determine CSI-RS transmission parameters through higher-layer signaling, such as Radio Resource Control (RRC) signaling (see also REF 5) from an eNB, such as eNB 102. DMRS is transmitted only in the BW of a respective PDSCH or PDCCH, and the UE can use the DMRS to demodulate information in a PDSCH or PDCCH. The eNB 102 can also indicate to UEs, through a System Information Block (SIB), that a DL Sub-Frame (SF), in a period of 10 successive SFs that is referred to as a frame, is configured as a Multicast-Broadcast Single Frequency Network (MBSFN) SF (see also REF 1).

To assist cell search and synchronization, an eNB, such as eNB 102, can transmit synchronization signals such as a Primary Synchronization Signal (PSS) and a Secondary Synchronization Signal (SSS) in a serving cell. Although having a same structure, the time-domain positions of synchronization signals within a frame that includes ten SFs can differ depending on whether a cell is operating in Frequency Division Duplex (FDD) or Time Division Duplex (TDD). Therefore, after acquiring the synchronization signals, a UE, such as UE 114 or UE 116, can determine whether a cell operates in FDD or in TDD and a SF index within a frame. The PSS and SSS occupy the central 72 sub-carriers, also referred to as Resource Elements (REs), of a DL operating bandwidth. Additionally, the PSS and SSS can inform of a Physical Cell IDentifier (PCID) for a cell and therefore, after acquiring the PSS and SSS, UE 114 or UE 116 can know the PCID of the transmitting cell.

Figure 4A:
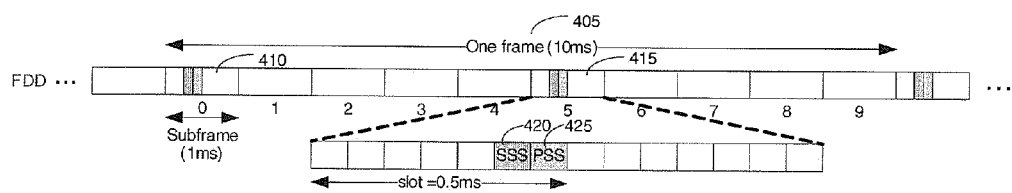
FIG. 4A illustrates example time domain positions for PSS and SSS for FDD according to this disclosure.
Figure 4B:
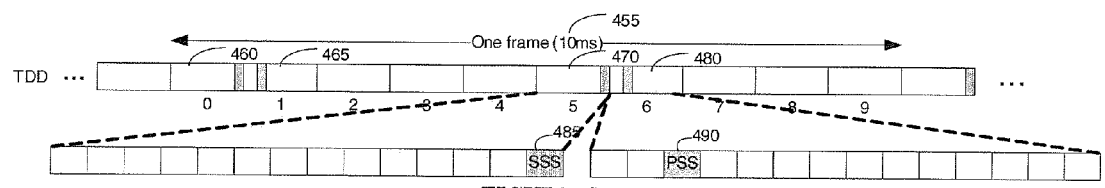
FIG. 4B illustrates example time domain positions for PSS and SSS for TDD according to this disclosure.

FIG. 4A illustrate example time domain positions for PSS and SSS for FDD according to this disclosure. FIG. 4B illustrates time domain positions for PSS and SSS for TDD according to this disclosure. The embodiments of the time domain positions shown in FIGS. 4A and 4B are for illustration only. Other embodiments could be used without departing from the scope of the present disclosure.

As shown in FIG. 4A, in case of FDD, in every frame 405, eNB 102 transmits a PSS 425 within a last symbol of a first slot of SF#0 410 and SF#5 415 and a SSS 420 within a second last symbol of a same slot, wherein a SF includes two slots. In case of TDD, as shown in the example shown in FIG. 4B, in every frame 455, eNB 102 transmits a PSS 490 within a third symbol of SF#1 465 and SF#6 480 and a SSS 485 in a last symbol of SF#0 460 and SF#5 470. The difference allows UE 114 or UE 116 to detect the duplex scheme on a cell. The REs used by eNB 102 to transmit PSS and SSS are not available for transmission of any other DL signaling.

A logical channel that carries system control information is referred to as Broadcast Control CHannel (BCCH). A BCCH is mapped to either a transport channel referred to as a Broadcast CHannel (BCH) or to a DL Shared CHannel (DL-SCH). A BCH is mapped to a physical channel referred to as Physical BCH (PBCH). A DL-SCH is mapped to PDSCH. A Master Information Block (MIB) is transmitted using BCH while other System Information Blocks (SIBs) are provided using DL-SCH. After UE 116 acquires a PCID for a cell, UE 116 can perform DL channel measurement using a CRS to decode PBCH and PDSCH.

A MIB includes a minimal amount of system information that is needed for UE 116 to receive remaining system information provided by DL-SCH. More specifically, a MIB has predefined format and includes information of DL bandwidth, Physical Hybrid-ARQ Indicator Channel (PHICH, 3-bit), System Frame Number (SFN) (Most Significant Bits (MSBs) 8-bit) and 10 spare bits that UE 116 can determine (e.g., assume) to all have a predetermined value such as '0' (see also REF 5). UE 116 requires a PHICH configuration to be able to receive PDCCH which, in turn, is typically needed to receive DL-SCH. A PHICH configuration includes a number of groups used to transmit a PHICH and a number of SF symbols for a PHICH transmission (see also REF 3). A UE can indirectly acquire the two Least Significant Bits (LSBs) of a SFN after BCH decoding. A PBCH is transmitted using a minimum bandwidth of 1.08 MHz in the central part of a DL operating bandwidth of the cell and over four SFs in successive frames where each SF is a first SF of a frame. The 40 msec timing is detected blindly without requiring explicit signaling. Also, in each SF, a PBCH transmission is self-decodable and UEs with good channel conditions may detect a PBCH in less than four SFs. Each individual PBCH transmission within a frame, from a period of four frames, is referred to as PBCH segment. To decode a PBCH segment, a UE can attempt four different decoding operations corresponding to the four different possibilities for the scrambling code conveying the two LSBs of the SFN.

The UE can also combine PBCH receptions in successive frames to improve a detection probability for the MIB provided that the successive frames convey the same MIB. This means that the successive frames are in a same quadruple of frames and the MIB includes the same SFN. For the remaining embodiments of this disclosure, the capability for a UE to combine, prior to decoding, PBCH receptions across successive frames and perform multiple decoding operations corresponding to the hypotheses for the scrambling code conveying the two LSBs of the SFN and for the successive frames to belong in a same quadruple of frames is assumed unless otherwise noted.

Most system information is included in different SIBs (see also REF 5). An eNB, such as eNB 102, transmits SIBs using respective DL-SCHs. A presence of system information on a DL-SCH in a SF is indicated by a transmission of a corresponding PDCCH conveying a codeword with a CRC scrambled with a System Information RNTI (SI-RNTI). SIB1 mainly includes information related to whether a UE is allowed to camp on a respective cell. In case of TDD, SIB1 also includes information about an allocation of UL/DL SFs and configuration of a special SF (see also REF 1). SIB1 is always transmitted in SF#5. A set of Resource Blocks (RBs) in a DL bandwidth over which SIB 1 is transmitted, where each RB includes twelve consecutive REs, as well as other aspects of an associated transport format, can vary as signaled on an associated PDCCH. SIB1 also includes information about a time-domain scheduling of remaining SIBs (SIB2 and beyond). SIB2 includes information that UEs need to obtain in order to be able to access a cell, including an UL cell bandwidth, random-access parameters, and parameters related to UL power control. SIB3-SIB13 mainly include information related to cell reselection, neighboring-cell-related information, public warning messages, and so on.

Figure 5A:
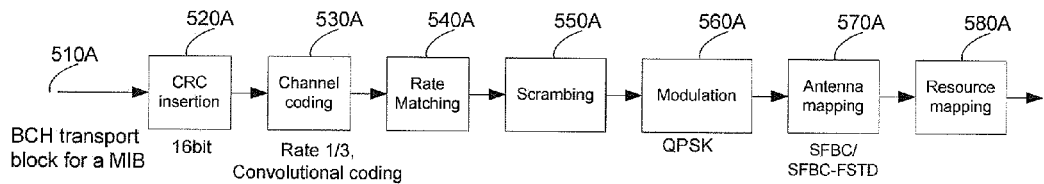
FIG. 5A illustrates an example PBCH transmitter according to this disclosure.

FIG. 5A illustrates an example PBCH transmitter according to this disclosure. The embodiment of the PBCH transmitter shown in FIG. 5A is for illustration only. Other embodiments could be used without departing from the scope of the present disclosure.

As shown in FIG. 5A, eNB 102 first processes a BCH transport block corresponding to a MIB 510A by including a 16-bit CRC 520A followed by channel coding 530A using a rate-1/3 tail-biting convolutional code, rate matching 540A, and bit-level scrambling 550A. Subsequently, eNB 102 applies QPSK modulation 560A to a coded and scrambled BCH transport block. In case eNB 102 includes more than one transmitter antenna ports, eNB 102 can transmit the BCH using multi-antenna transmission 570A such as transmitter antenna diversity. For example, Space-Frequency Block Coding (SFBC) can be used in case of two antenna ports and combined SFBC/Space-Frequency Time Diversity (FSTD) in case of four antenna ports. By blindly detecting a transmitter antenna diversity scheme used for PBCH, UE 116 determines a number of cell-specific antenna ports and also a transmitter antenna diversity scheme used for control signaling. Finally, eNB 102 applies resource mapping 580A and transmits the PBCH.

Figure 5B:
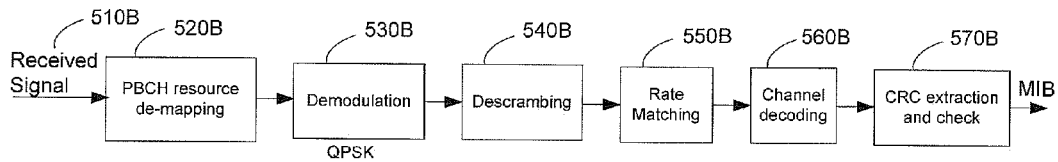
FIG. 5B illustrates an example PBCH receiver according to this disclosure.

FIG. 5B illustrates a PBCH receiver according to this disclosure. The embodiment of the PBCH receiver shown in FIG. 5B is for illustration only. Other embodiments could be used without departing from the scope of the present disclosure.

Referring to FIG. 5B, UE 116 receives a signal 510B transmitted by eNB 102 in a first SF of a frame, a de-mapper performs de-mapping of resources (REs) that eNB 102 used to transmit PBCH 520B, a demodulator demodulates PBCH symbols 530B, a descrambler descrambles the demodulated PBCH symbols 540B followed by a rate matching unit 550B and finally by a channel decoder 560B and a CRC extraction and check unit 570B. If the CRC check is positive, UE 116 considers that it detected the MIB; otherwise, UE 116 attempts a new PBCH decoding. The new PBCH decoding can correspond to a different hypothesis for the scrambling code conveying the LSBs of the SFN or can correspond to combined PBCH receptions in multiple successive frames.

Figure 6:
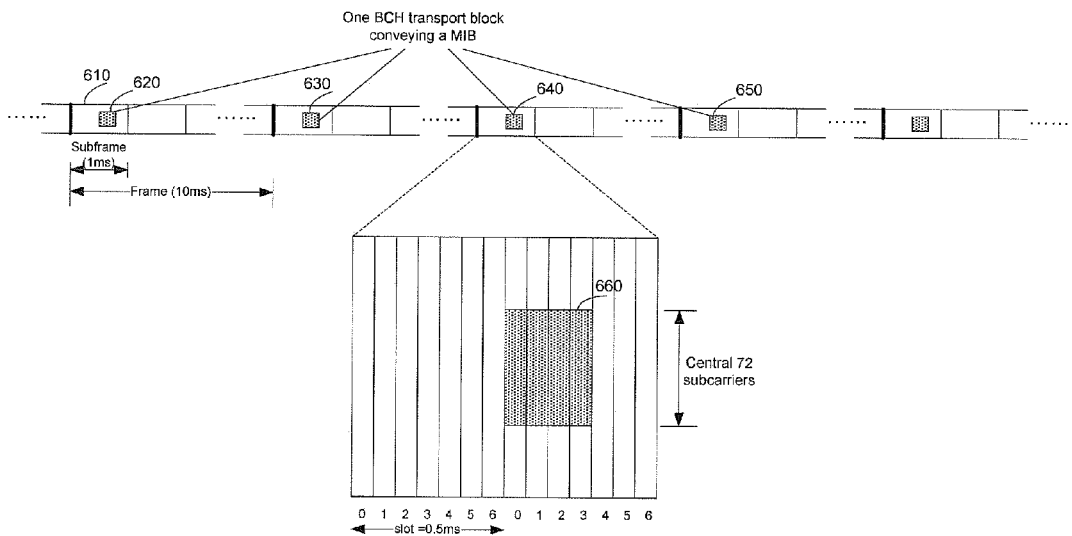
FIG. 6 illustrates an example PBCH resource mapping according to this disclosure.

FIG. 6 illustrates an example PBCH resource mapping according to this disclosure. The embodiment of the PBCH resource mapping shown in FIG. 6 is for illustration only. Other embodiments could be used without departing from the scope of the present disclosure.

As shown in FIG. 6, eNB 102 transmits one BCH transport block, corresponding to a MIB, every 40 msec or, equivalently, every 4 frames. Therefore, a BCH Transmission Time Interval (TTI) is 40 msec. The eNB 102 maps a coded BCH transport block to a first SF 610 of each frame in four consecutive frames, such as a first frame 620, second frame 630, third frame 640, and fourth frame 650. A PBCH is transmitted within a first four symbols of a second slot of SF#0 and over the 72 center REs (6 RBs) 660. In FDD, a PBCH transmission follows immediately after a PSS and SSS transmission in SF#0.

Figure 7:
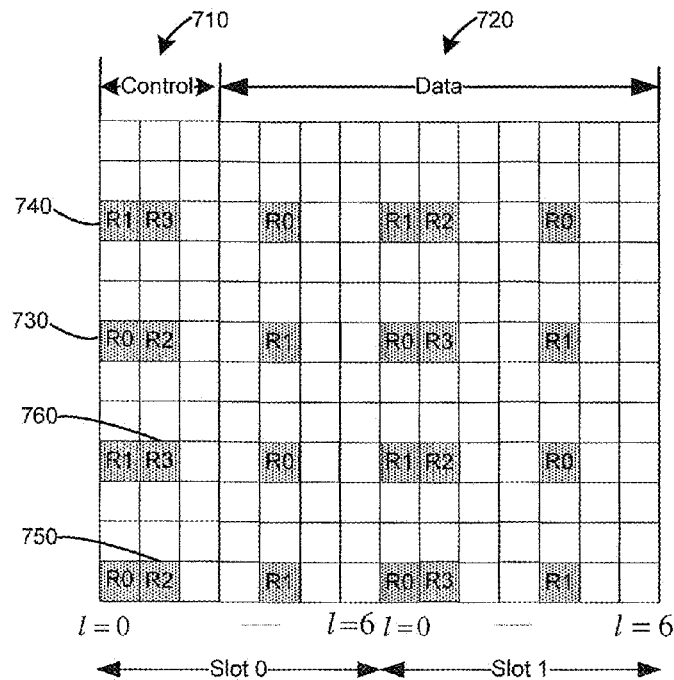
FIG. 7 illustrates an example CRS mapping in a RB of a SF according to this disclosure.

FIG. 7 illustrates an example CRS mapping in a RB of a SF according to this disclosure. The embodiment of the CRS mapping shown in FIG. 7 is for illustration only. Other embodiments could be used without departing from the scope of the present disclosure.

In the example shown in FIG. 7, for a SF with a control region of 3 symbols 710 and a data region of 11 symbols 720, CRS is mapped for antenna ports 0-3, with R0 730-R3 760 (that is, R0 730, R1 740, R2 750 and R3 760), respectively. For the PBCH transmission symbols in FIG. 6, UE 116 assumes that the first and second SF symbols have CRS for R0 730-R1 740 and R2 750-R3 760, respectively, regardless of an actual number of CRS antenna ports used by eNB 102 that can be either 1, or 2, or 4.

In a TDD communication system, a communication direction in some SFs in a frame is in the DL and in some other SFs is in the UL. Table 1 provides indicative TDD UL-DL configurations over a period of a frame. In Table 1, "D" denotes a DL SF, "U" denotes an UL SF, and "S" denotes a special SF that includes a DL transmission field referred to as DwPTS, a Guard Period (GP), and an UL transmission field referred to as UpPTS (see also REF 1). Several combinations exist for the duration of each field in a special SF subject to a condition that a total duration is one SF (1 msec).

TABLE 1

| TDD UL/DL configurations | | | | | | | | | | | |
|---|---|---|---|---|---|---|---|---|---|---|---|
| TDD UL/DL Config-uration | DL-to-UL Switch-point periodicity | SF number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 2 provides a special SF configuration in terms of a number of symbols for DwPTS, GP, and UpPTS.

TABLE 2

| TDD special subframe configurations | | | | | | | | | | |
|---|---|---|---|---|---|---|---|---|---|---|
| DwPTS | 12 | 11 | | 10 | | 9 | | 6 | | 3 |
| GP | 1 | 1 | 2 | 2 | 3 | 3 | 4 | 6 | 9 | 10 |
| UpPTS | 1 | 2 | 1 | 2 | 2 | 2 | 1 | 2 | 2 | 1 |

For Machine-Type Communication (MTC), it is more efficient to use an already deployed radio access technology and exploit economies of scale to control cost rather than create a new radio access technology. MTC UEs typically require low operational power consumption and are expected to communicate with infrequent small burst transmissions. In addition, MTC UEs can be deployed deep inside buildings and this can require significant Coverage Enhancement (CE) relative to a conventional cell coverage footprint.

As MTC UEs can be installed in basements of residential buildings or, generally, in locations experiencing significantly larger penetration losses than conventional UEs, in extreme coverage scenarios MTC UEs can have characteristics such as very low data rate, greater delay tolerance, and limited or no mobility, thereby potentially being capable to operate without some messages/channels. MTC needs to be supported in both FDD and TDD systems. Required system functionalities for MTC UEs, but also for conventional UEs in general, in a CE operating mode are assumed to include synchronization, cell search, power control, random access process, channel estimation, measurement reporting, and DL/UL data transmission (including DL/UL resource allocation). Not all MTC UEs require CE or require a same amount of CE. Conversely, conventional UEs can also require CE. Therefore, as CE for physical channels consume additional resources and consequently result to lower spectral efficiency, it should be possible to enable associated techniques only for UEs that require such CEs.

Coverage enhancements cannot be typically achieved without relying on extensive repetitions for a transmission of a respective channel. Such repetitions can result into a significant additional overhead as same information is transmitted in larger frequency and/or time resources compared to an operation where CEs are not required. In case of CE for a PBCH, that will be referred to as CE-PBCH, as a respective MIB that will be referred to as CE-MIB is not expected to frequently change, an overhead associated with CE-PBCH repetitions can be mitigated by intermittently transmitting CE-BPCH repetitions. For example, a CE-PBCH can be repeated in DL SFs of a frame for a period of 4 frames (following same transmission characteristics across 4 frames as for a conventional PBCH) and then an eNB, such as eNB 102, can suspend transmission for next 996 frames resulting to a periodicity of 1000 frames or 10 seconds. However, a UE cannot know in advance the frames where eNB 102 transmits CE-PBCH as the UE does not know the SFN before detecting a CE-PBCH. Then, on average, the UE will be attempting CE-PBCH detection for at least 5 seconds before being able to detect a CE-PBCH, thereby incurring substantial power consumption in each attempt to detect a CE-PBCH.

Repetitions of a CE-PBCH transmission need to be mapped to a set of resources that can be either predetermined or can be blindly determined by a UE based on decoding outcomes for a predetermined set of hypotheses. In either case, similar to the PBCH, a resource mapping needs to be defined for transmissions of CE-PBCH repetitions in order for a UE to be able to detect a CE-PBCH. A PBCH transmission can be one of CE-PBCH repetitions if the MIB and the CE-MIB carry the same information contents (including having a same CRC). It is beneficial for a resource mapping of CE-PBCH repetitions to enable simple transmitter or receiver implementation, enable a UE to determine whether a transmission of CE-PBCH repetitions exists over a time period, and enable efficient mechanism to enhance coverage of a CE-PBCH.

Existing designs may not satisfy a required CE level for all deployment scenarios of UEs in general and MTC UEs in particular as a CE as high as, for example, 15 deciBell (dB) can be required for UEs located in environments with severe propagation loss to a serving eNB. In addition, a required CE level can be different for different eNBs, for example depending upon the eNB transmission power or an associated cell size, as well as for different UEs, such as depending upon a location of a UE or on a number of UE receiver antennas.

Embodiments of this disclosure provide candidate resource mappings for transmitting a CE-PBCH using repetitions while also considering presence of other signaling from an eNB. Embodiments of this disclosure also provide mechanisms for a UE to determine whether an eNB transmits a CE-PBCH over a time period. Additionally, embodiments of this disclosure provide mechanisms to maximize a utilization of resources for CE-PBCH repetitions.

The following embodiments are not limited to MTC UEs and can be applicable to any type of UEs requiring an enhancement in coverage beyond a coverage supported by a conventional operation. Moreover, although the descriptions consider SF structures with symbols having a normal Cyclic Prefix (CP), they are also applicable for SF structures with symbols having a extended CP (see also REF 1).

A transmission of a CE-PBCH segment can be repeated multiple times within a frame in order to provide an associated CE level for either a FDD system or a TDD system. Each CE-PBCH segment can be transmitted over a larger number of SFs in a frame than a PBCH segment. Regardless of whether or not a CE-MIB carries same information contents (including a same CRC) as a MB, this disclosure considers that a number of REs an eNB uses for transmitting a CE-PBCH repetition can be same as a number of REs the eNB uses to transmit a PBCH. Nevertheless, this is not a limitation for the embodiments of this disclosure and any number of REs can be used by an eNB to transmit each CE-PBCH repetition.

In the exemplary PBCH transmission over six middle RBs of a DL operating BW and in four OFDM symbols containing REs reserved for CRS transmission from four eNB antenna ports, a number of REs used to transmit a MIB is 240 where 48 REs, from the 288 REs over 6 RBs and 4 OFDM symbols, are reserved for CRS transmission from four eNB antenna ports (even when an actual number of eNB antenna ports for CRS transmission is one or two). This can enable combining of CE-PBCH repetitions at a received symbol level, before or after demodulation, thereby enabling a simple UE receiver operation without having to combine CE-PBCH repetitions that can have a different coding rate.

In certain embodiments, a CE-PBCH repetition occurs in a quadruplet of OFDM symbols in a SF. A number of REs reserved for CRS transmission in any other quadruplet of OFDM symbols an eNB, such as eNB 102, uses to transmit a repetition of a CE-PBCH over 6 RBs in a SF can be different than 48 depending on a selection of respective OFDM symbols in the SF. In order to provide a same number of CE-MIB modulated symbols for each CE-PBCH repetition, some REs in a respective quadruplet of OFDM symbols that contains fewer REs reserved for CRS than the quadruplet of OFDM symbols for a PBCH transmission are not used to transmit CE-MIB modulated symbols and these REs are referred to as barred REs.

In a first mapping approach, barred REs are located in a same OFDM symbol as REs reserved for CRS. This can enable eNB 102 to use a respective power, that would otherwise be allocated to transmit a signal in the barred REs, to increase a power used to transmit CRS (over a DL operating BW) or to increase a power used to transmit CE-MIB symbols in the OFDM symbol of the barred REs. Therefore, denoting as $N_{CE-MIB}$ a number of REs used to map CE-MIB modulated symbols, for example $N_{CE-MIB}=240$, and denoting as $N_{quad}$ a number of REs in a quadruple of OFDM symbols, after excluding REs reserved for CRS, barred REs are placed next to CRS REs in a same OFDM symbol if $N_{quad}=N_{CE-MIB}+24$.

Figure 8:
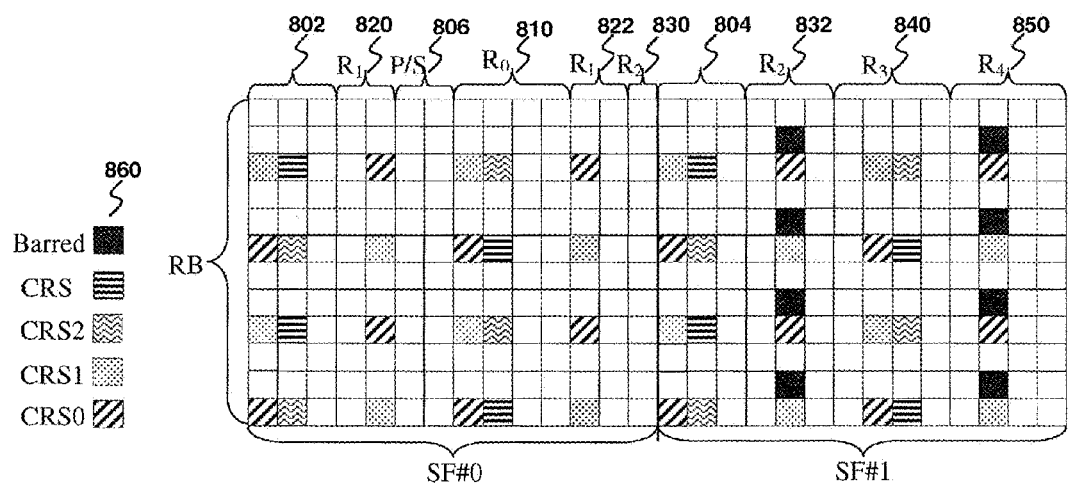
FIG. 8 illustrates a first mapping of REs for CE-PBCH repetitions in a first SF and in a second SF according to this disclosure.

FIG. 8 illustrates a first mapping of REs for CE-PBCH repetitions in a first SF and in a second SF according to this disclosure. The embodiment of the RE mapping shown in FIG. 8 is for illustration only. Other embodiments could be used without departing from the scope of the present disclosure.

Referring to FIG. 8, a UE, such as UE 114, determines (e.g., assumes) that a first three OFDM symbols in SF#0 802 and in SF#1 804 and the OFDM symbols used to transmit PSS/SSS 806 are not used to transmit a CE-PBCH repetition. For example, some or all of these first three OFDM symbols can be used to transmit DL control signaling. Each CE-PBCH repetition is over four OFDM symbols that are consecutive after excluding OFDM symbols allocated to transmissions of existing signals (PSS/SSS) or channels (DL control channels or PBCH). If the CE-MIB conveys same contents as the MIB, including a same CRC, a PBCH transmission 810 can be considered as a repetition of a CE-PBCH transmission (default repetition). If the CE-MIB does not convey same contents as the MIB, a PBCH transmission 810 cannot be considered as a repetition of a CE-PBCH. A first repetition of a CE-PBCH transmission includes OFDM symbols 820 and OFDM symbols 822. A second repetition of a CE-PBCH transmission includes OFDM symbols 830 and OFDM symbols 832. A third repetition of a CE-PBCH transmission includes OFDM symbols 840. Finally, a fourth repetition of a CE-PBCH transmission in the first two SFs of a frame includes OFDM symbols 850. The second and the fourth repetitions of a CE-PBCH transmission include 4 fewer REs per RB (or 24 REs per 6 RBs) for CRS transmission. A respective number of barred REs 860 are included in OFDM symbols that include CRS.

In a second mapping approach, barred REs are located in one or more OFDM symbols that do not include REs reserved to transmit CRS. This can enable eNB 102 to use a respective power that would have otherwise been allocated to transmit a signal in the barred REs, to increase a power used to transmit CE-MIB symbols. A reason for allocating barred REs in OFDM symbols that do not contain CRS is because in OFDM symbols that contain CRS a transmission power may need to be increased regardless of whether there are barred REs in such OFDM symbols. Barred REs can be placed at a same frequency location as CRS REs and in an OFDM symbol next to an OFDM symbol with reserved CRS REs if $N_{quad}=N_{CE-MIB}+24$. This creates a virtual pattern of REs reserved for CRS that is same as an actual pattern of REs reserved for CRS and a UE can assume that CE-MIB modulated symbols are not mapped to both REs reserved for CRS and barred REs.

Figure 9A:
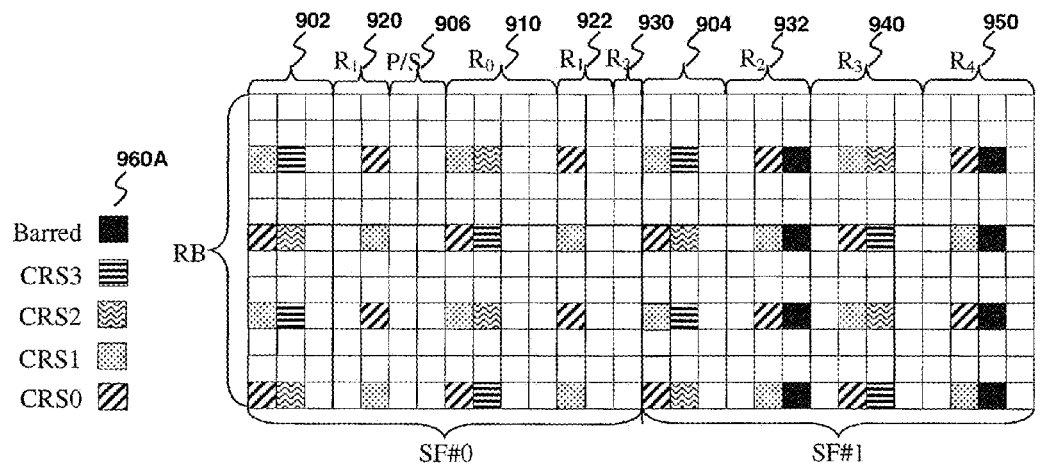
FIG. 9A illustrates a second mapping of REs for CE-PBCH repetitions in a first SF and in a second SF according to this disclosure.

FIG. 9A illustrates a second mapping of REs for CE-PBCH repetitions in a first SF and in a second SF according to this disclosure. The embodiment of the mapping shown in FIG. 9A is for illustration only. Other embodiments could be used without departing from the scope of the present disclosure.

In the example shown in FIG. 9A, similar to FIG. 8, a UE assumes that a first three OFDM symbols in SF#0 902 and in SF#1 904 and OFDM symbols used to transmit PSS/SSS 906 are not used to transmit a CE-PBCH repetition (for example, some or all of these first three OFDM symbols can be used to transmit DL control signaling). Each CE-PBCH repetition is over four consecutive OFDM symbols (after excluding OFDM symbols used for transmissions of existing signals (PSS/SSS) or channels (DL control channels or PBCH)). If the CE-MIB conveys same contents as the MIB, including a same CRC, a PBCH transmission 910 can be considered as a repetition of a CE-PBCH (default repetition). If the CE-MIB does not convey same contents as the MIB, a PBCH transmission 910 cannot be considered as a repetition of a CE-PBCH transmission. A first repetition of a CE-PBCH transmission includes OFDM symbols 920 and OFDM symbols 922. A second repetition of a CE-PBCH transmission includes OFDM symbols 930 and OFDM symbols 932. A third repetition of a CE-PBCH transmission includes OFDM symbols 940. Finally, a fourth repetition of a CE-PBCH transmission in the first two SFs of a frame includes OFDM symbols 950. The second and the fourth repetitions of a CE-PBCH transmission include 4 fewer REs per RB (or 24 REs per 6 RBs) for CRS transmission. A respective number of barred REs 960A are distributed in OFDM symbols that do not include CRS. The placement of the barred REs can be such that it creates a same pattern for REs used to transmit a CE-PBCH repetition as for a PBCH transmission and, for a quadruplet of OFDM symbols eNB 102 uses to transmit CE-PBCH, all REs per RB in 2 OFDM symbols are used to transmit a CE-PBCH while in the other 2 OFDM symbols same REs as in the case of PBCH are not used to transmit a CE-PBCH.

As a transmission of CE-PBCH repetitions needs to be supported in DL SFs where UEs can receive signaling from eNB 102 and, as at least some of the UEs may not be aware of the transmission of CE-PBCH repetitions, it is beneficial to minimize an impact from a transmission of CE-PBCH repetitions to an operation of UEs connected to eNB 102 (RRC_CONNECTED UEs—see also REF 5). Moreover, in certain embodiments, eNB 102 transmits CSI-RS in order to enable UEs to measure a channel medium or interference. UEs are informed by higher layer signaling of a configuration of CSI-RS transmission parameters such as a SF index and a periodicity for CSI-RS transmissions and an associated configuration (number of antenna ports, CSI-RS pattern, and so on). The higher layer signaling can be an RRC signaling (see also REF 3 and REF 5). A problem arises when a CSI-RS transmission occurs in some OFDM symbols of a SF that also includes a CE-PBCH repetition since the REs that the eNB 102 uses to transmit CSI-RS in the middle 6 RBs can collide with REs that the eNB 102 uses to transmit a CE-PBCH repetition and as at least some first UEs with RRC connection to eNB 102 cannot be aware of the presence of a CE-PBCH transmission while some other second UEs, such as UE 114 attempting to decode the CE-PBCH, cannot be aware of the presence of the CSI-RS transmission.

In certain embodiments, the eNB 102 does not alter a CSI-RS transmission due to a presence of a CE-PBCH repetition but instead the eNB 102 punctures the transmission of the CE-PBCH repetition in REs in which the CSI-RS is transmitted. Puncturing the transmission ensures that an operation of the first UEs is not affected while a small degradation can be expected in a reception reliability of a CE-PBCH by UE 114.

Figure 9B:
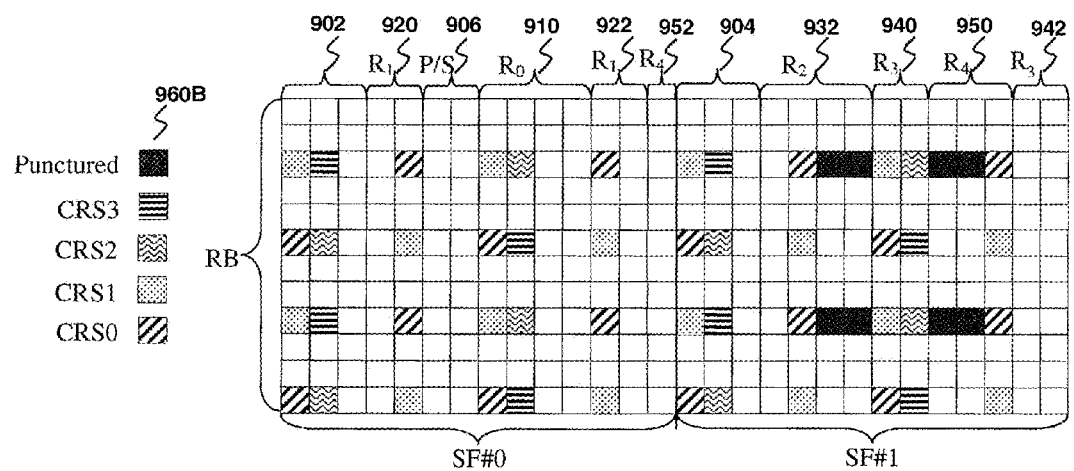
FIG. 9B illustrates an example allocation of REs for CE-PBCH repetitions in a first SF and in a second SF of a frame where a CE-PBCH transmission is punctured in some REs in the second SF based on a CSI-RS pattern according to this disclosure.

FIG. 9B illustrates an example allocation of REs for CE-PBCH repetitions in a first SF and in a second SF of a frame where a CE-PBCH transmission is punctured in some REs in the second SF based on a CSI-RS pattern according to this disclosure. The embodiment of the allocation shown in FIG. 9B is for illustration only. Other embodiments could be used without departing from the scope of the present disclosure.

Referring to FIG. 9B, a transmission for CE-PBCH repetitions is supported in a same manner as in FIG. 9A and a similar notation applies. However, in contrast to FIG. 9A, in the example shown in FIG. 9B, the eNB 102 punctures (suspends) CE-PBCH transmission is REs used for CSI-RS transmission 960B but this action by eNB 102 is unknown to UE 114 which assumes that eNB 102 actually transmits CE-PBCH is REs 960B.

In a second approach, a transmission of CE-PBCH repetitions by eNB 102 excludes REs in predetermined OFDM symbols of predetermined SFs according to a valid CSI-RS pattern that is configured by the eNB 102. This ensures that a reception reliability of a CE-PBCH by UE 114 is not affected but there can be a significant impact on the CSI measurement accuracy of the first UEs.

Figure 9C:
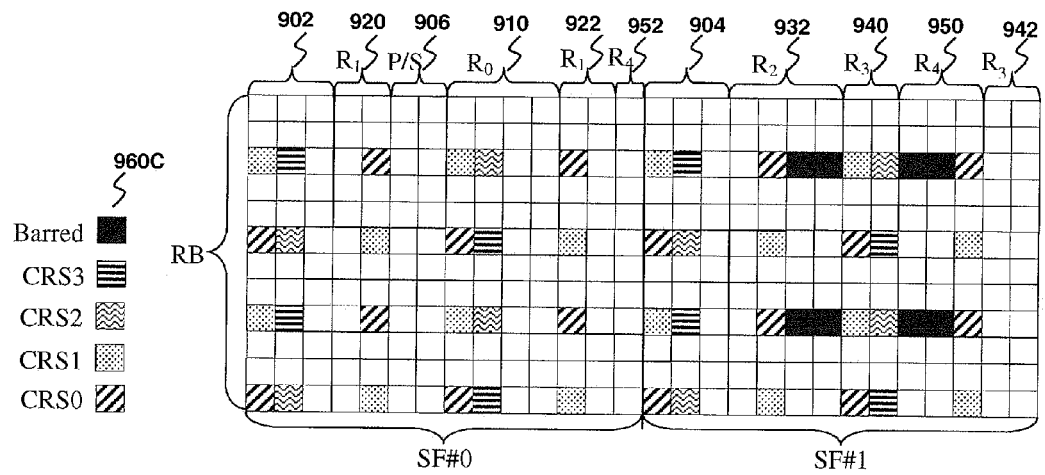
FIG. 9C illustrates an example allocation of REs for CE-PBCH repetitions in a first SF and in a second SF of a frame where a CE-PBCH transmission is barred in some REs in the second SF based on a CSI-RS pattern according to this disclosure.

FIG. 9C illustrates an example allocation of REs for CE-PBCH repetitions in a first SF and in a second SF of a frame where a CE-PBCH transmission is barred in some REs in the second SF based on a CSI-RS pattern according to this disclosure. The embodiment of the allocation shown in FIG. 9C is for illustration only. Other embodiments could be used without departing from the scope of the present disclosure.

In the example shown in FIG. 9C, a transmission for CE-PBCH repetitions is supported in a same manner as in FIG. 9A and a similar notation applies. In contrast to FIG. 9A, in the example shown in FIG. 9C, the REs barred for CE-PBCH transmission 960C are additionally selected to be ones corresponding to a valid CSI-RS pattern. Additionally, in the example shown in FIG. 9C, an ordering of OFDM symbols for each quadruple is re-arranged relative to FIG. 6 in order for each quadruple to include a same number of REs reserved for CRS or are barred.

For example, for the second mapping approach and a location of barred REs as in FIG. 9A, an exact copy of a CE-MIB repetition can be made by re-arranging a mapping of CE-MIB modulated symbols to a quadruplet of OFDM symbols according to a presence of REs that are reserved for CRS transmission or that are barred. Mapping CE-MIB modulation symbols to a quadruplet of OFDM symbols in a same manner for each CE-PBCH repetition facilitates a simple determination by UE 114 as to whether or not eNB 102 transmits a CE-PBCH in a respective SF or frame.

Figure 10:
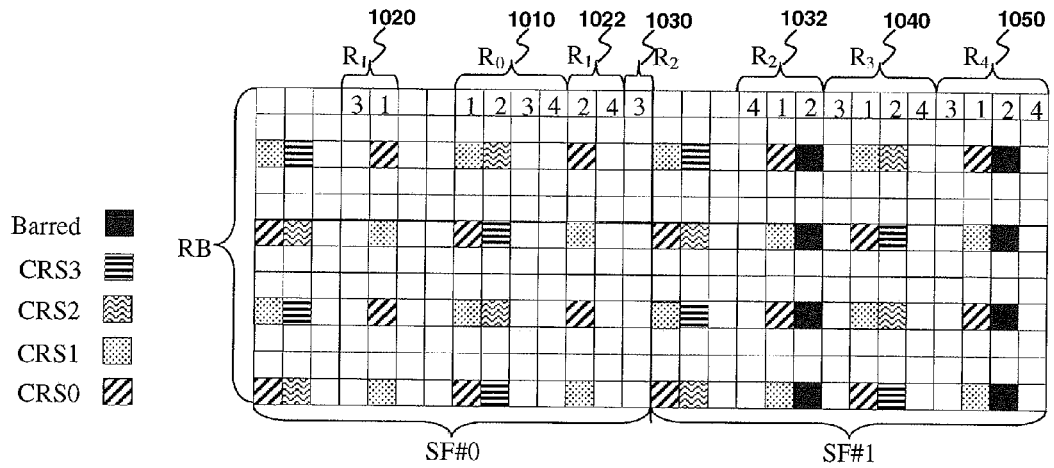
FIG. 10 illustrates an example indexing of OFDM symbols used to transmit a CE-PBCH repetition depending on whether they include REs that are reserved for CRS transmission or that are barred according to this disclosure.

FIG. 10 illustrates an example indexing of OFDM symbols used to transmit a CE-PBCH repetition depending on whether they include REs that are reserved for CRS transmission or that are barred according to this disclosure. The embodiment of the indexing shown in FIG. 10 is for illustration only. Other embodiments could be used without departing from the scope of the present disclosure.

A same structure of OFDM symbols as one for transmitting PBCH 1010 is maintained for a CE-PBCH repetition. This implies that an indexing of OFDM symbols, in a quadruplet of OFDM symbols used for mapping CE-MIB modulated symbols of a CE-PBCH repetition, is not according to their location in time but it is according to whether or not the OFDM symbols include REs that are reserved for CRS transmission or are barred. For example, for a first CE-PBCH repetition in a quadruplet of OFDM symbols 1020 and 1022, a first OFDM symbol that includes REs reserved for CRS transmission is indexed as a first OFDM symbol (denoted as '1') for transmitting CE-MIB modulated symbols even though it is a second symbol in the quadruplet of OFDM symbols. Similar, a second OFDM symbol that includes REs reserved for CRS transmission is indexed as a second OFDM symbol (denoted as '2') for transmitting CE-MIB modulated symbols even though it is a third OFDM symbol in the quadruplet of OFDM symbols. Additionally, a first and a fourth OFDM symbols in the quadruplet of OFDM symbols that do not include REs reserved for CRS transmission or barred REs are indexed as a third (denoted by '3') and a fourth (denoted by '4') OFDM symbols for transmitting CE-MIB modulated symbols. A same indexing applies for a second CE-PBCH repetition 1030 and 1032, a third CE-PBCH repetition 1040, and a fourth CE-PBCH repetition 1050 in quadruplets of OFDM symbols where OFDM symbols that contain REs reserved for CRS transmission or barred REs are indexed first and OFDM symbols that do not contain CRS REs or barred REs are indexed second for mapping CE-MIB modulated symbols. A same principle for indexing OFDM symbols, in a quadruplet of OFDM symbols, can directly apply in any remaining SFs of a frame where eNB 102 transmits CE-PBCH repetitions.

Depending upon a set of OFDM symbols that are available for a transmission of CE-PBCH repetitions, a quadruplet of OFDM symbols may include more than 8 REs per RB that are reserved for CRS. Then, a number of REs available for transmitting a CE-PBCH repetition is smaller than a number of REs available for transmitting a PBCH or a CE-PBCH repetition, as illustrated in FIG. 8 or FIG. 9A; thereby resulting to a higher coding rate and a reduced reception reliability for the CE-PBCH repetition and an inability to have a same structure as the one used to transmit the PBCH, as illustrated in FIG. 10. To avoid these shortcomings, when eNB 102 uses four consecutive OFDM symbols that include more than 8 REs per RB that are reserved for CRS to transmit a CE-PBCH repetition, a quadruplet of OFDM symbols may not be formed by four consecutive OFDM symbols but by four OFDM symbols that result to 8 REs per RB that are reserved for CRS.

Figure 11:
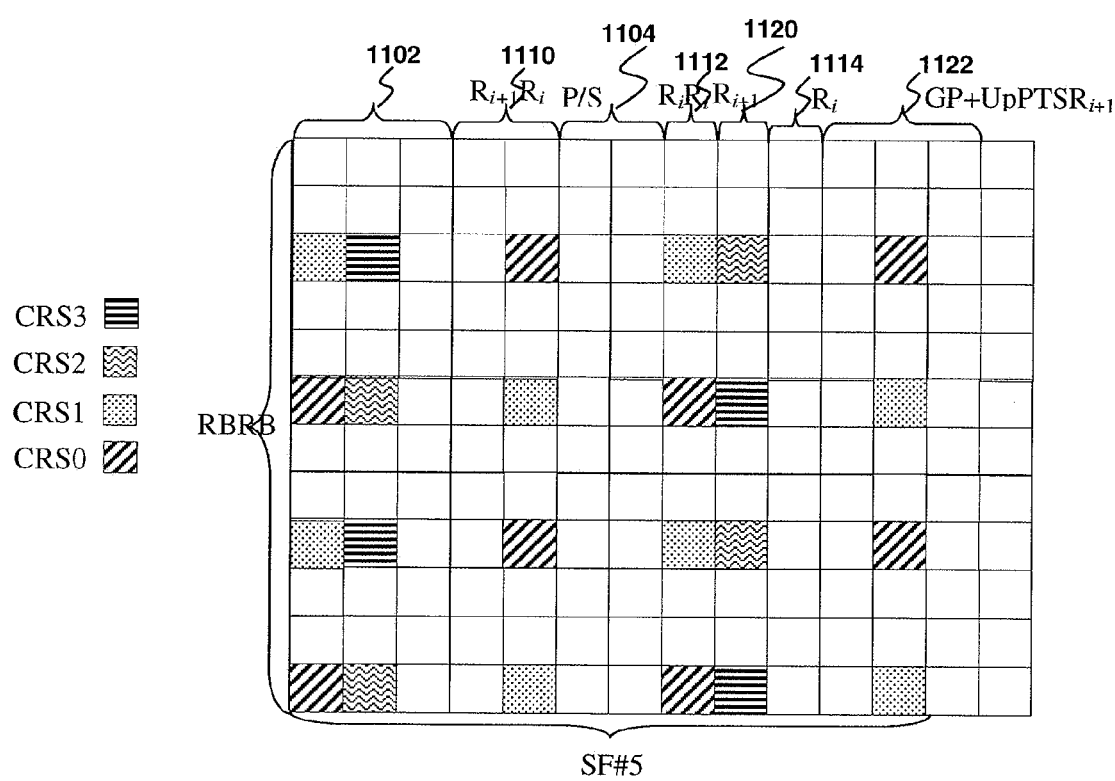
FIG. 11 illustrates a first example formation of a quadruple of OFDM symbols for a CE-PBCH repetition that results to 8 REs per RB that are reserved for CRS according to this disclosure.

FIG. 11 illustrates a first example formation of a quadruple of OFDM symbols for a CE-PBCH repetition that results to 8 REs per RB that are reserved for CRS according to this disclosure. The embodiment of formation of a quadruple of OFDM symbols for a CE-PBCH repetition shown in FIG. 11 is for illustration only. Other embodiments could be used without departing from the scope of the present disclosure.

For a transmission of a CE-PBCH repetition formed by quadruplets of OFDM symbols in SF#5, UE 114 determines (e.g., assumes) that a first three OFDM symbols 1102 and OFDM symbols used to transmit PSS/SSS 1104 are not used by eNB 102 to transmit a CE-PBCH repetition. If a quadruplet of OFDM symbols for a CE-PBCH repetition were to be formed by consecutive available OFDM symbols, repetition i would result to twelve (12) REs per RB reserved for CRS, while repetition i+1 would result to four (4) REs per RB reserved for CRS. To enable having a same number of REs per RB that are reserved for CRS in each CE-PBCH repetition, an OFDM symbol that would result in 12 REs per RB reserved for CRS in a quadruple of OFDM symbols for a first CE-PBCH repetition is instead included for a second CE-PBCH repetition that would otherwise have 4 REs per RB reserved for CRS. Instead of the skipped OFDM symbol, a first next OFDM symbol that does not include REs reserved for CRS is included. Therefore, using the above restriction in forming a quadruple of OFDM symbols, the OFDM symbol used by eNB 102 to transmit repetition i includes OFDM symbol 1110, OFDM symbol 1112 and OFDM symbol 1114 (while skipping OFDM symbol 1120) while the one used by eNB 102 to transmit repetition i+1 includes OFDM symbols 1120, and 1122 (instead of OFDM symbol 1114 and OFDM symbol 1122).

When there are multiple levels (numbers) of repetitions for a CE-PBCH transmission, resources for repetitions for a first CE level with fewer repetitions can be included in resources for repetitions for a second level with more repetitions. Then, a formation of quadruplets of OFDM symbols can be done in a successive procedure, where quadruplets can be formed first for resources for repetitions at the first CE level, and then formed for resources for repetitions at the second CE level. For example, a first CE level for CE-PBCH repetitions can include only SF#0 and SF#5 while a second CE level can additionally include SF#1 and SF#6. Then, quadruplets are first formed considering a total available OFDM symbols in SF#0 and SF#5 for repetitions for the first CE level and, if eNB 102 uses repetitions for the second CE level, additional quadruplets are formed considering a total available OFDM symbols in SF#1 and SF#6. For example, the first CE level for repetitions can be on resources common to FDD and TDD while the second CE level for repetitions can be on additional resources only for FDD.

In certain embodiments, a quadruplet of OFDM symbols and the middle six (6) RBs of a DL operating BW are not constrained to include CE-MIB modulated symbols for only a single CE-PBCH repetition.

For a PBCH transmission, a mapping that includes only MIB modulated symbols to a quadruplet of OFDM symbols in the six (6) RBs is appropriate. This is because multiplexing modulated symbols from another channel in some REs of the 6 RBs and in an OFDM symbol of the quadruplet of OFDM symbols leads to a more complicated eNB transmitter or UE receiver without providing any meaningful benefit. However, for CE-PBCH repetitions, as the same information is transmitted in the 6 RBs over multiple OFDM symbols, it is not necessary for a given quadruplet of OFDM symbol to include CE-MIB modulated symbols corresponding to a same CE-PBCH repetition. Instead, for a $N_{CE\text{-}MIB}^{total}$ total number of REs available for transmission of CE-PBCH repetitions over one or more SFs of a frame, $N_{CE\text{-}MIB}^{repetitions} = \lfloor N_{CE\text{-}MIB}^{total} / N_{CE\text{-}MIB} \rfloor$ CE-PBCH repetitions can be supported and $N_{CE\text{-}MIB}^{total} - N_{CE\text{-}MIB}^{repetitions} \cdot N_{CE\text{-}MIB}$ last REs, from the $N_{CE\text{-}MIB}^{total}$ REs, can support a partial repetition that includes first $N_{CE\text{-}MIB}^{total} - N_{CE\text{-}MIB}^{repetitions} \cdot N_{CE\text{-}MIB}$ REs conveying CE-MIB modulated symbols where $\lfloor\ \rfloor$ is the 'floor' function that rounds a number to its immediately lower integer.

$N_{CE\text{-}MIB}$ REs conveying CE-MIB modulated symbols for a CE-PBCH repetition are sequentially mapped to $N_{CE\text{-}MIB}$ REs from a total of $N_{CE\text{-}MIB}^{total}$ REs available for a CE-PBCH transmission in a frame without excluding any REs that are not reserved for CRS transmission (assuming a maximum of four respective antenna ports) or for PSS/SSS transmission (that is, excluding only REs reserved for CRS or PSS/SSS transmission and not excluding REs reserved for CSI-RS transmission). For a full CE-PBCH repetition with index r and REs from the $N_{CE\text{-}MIB}^{total}$ REs in a frame, where $0 \leq r < N_{CE\text{-}MIB}^{repetitions}$, a CE-PBCH repetition starts from RE $r \cdot N_{CE\text{-}MIB}$ and ends in RE $(r+1) \cdot N_{CE\text{-}MIB} - 1$. A partial CE-PBCH repetition starts from RE $N_{CE\text{-}MIB}^{repetitions} \cdot N_{CE\text{-}MIB}$ and ends in RE $N_{CE\text{-}MIB}^{total}$.

Figure 12:
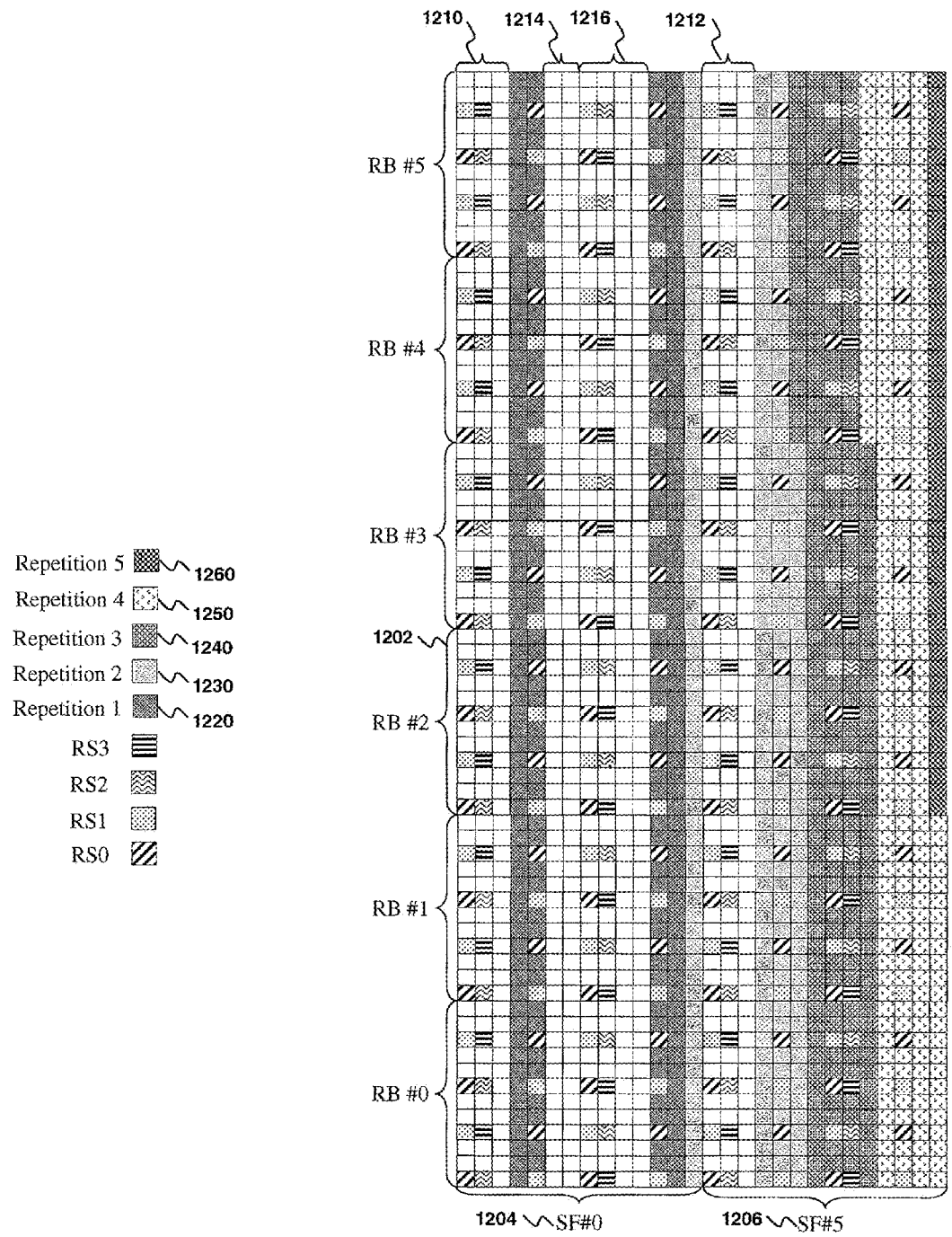
FIG. 12 illustrates an example sequential mapping of CE-PBCH repetitions to a total number of available REs for a CE-PBCH transmission in a frame according to this disclosure.

FIG. 12 illustrates an example sequential mapping of CE-PBCH repetitions to a total number of available REs for a CE-PBCH transmission in a frame according to this disclosure. The embodiment of the sequential mapping shown in FIG. 12 is for illustration only. Other embodiments could be used without departing from the scope of the present disclosure.

Repetitions of a CE-PBCH transmission are considered in middle 6 RBs 1202 in a first SF 1204, such as SF#0, and in a second SF 1206, such as SF#5, of a frame. Excluding a number of OFDM symbols at the beginning of each SF that UE 114 assumes the eNB 102 uses to transmit DL control signaling 1210 and 1212, and excluding REs reserved for transmissions of PSS/SSS 1214, PBCH 1216, and CRS, a number of total REs for repetitions of a CE-PBCH transmission in 6 RBs is $N_{CE\text{-}MIB}^{total} = 1008$. For $N_{CE\text{-}MIB} = 240$, a number of full repetitions for a CE-PBCH transmission is $N_{CE\text{-}MIB}^{repetitions} = \lfloor N_{CE\text{-}MIB}^{total} / N_{CE\text{-}MIB} \rfloor = 4$ (e.g., repetition 1 1220, repetition 2 1230, repetition 3 1240, and repetition 4 1250). If a MIB and a CE-MIB convey same information contents, including same CRC, UE 114 can consider a PBCH transmission as an additional repetition of a CE-PBCH transmission. Additional $N_{CE\text{-}MIB}^{total} - N_{CE\text{-}MIB}^{repetitions} \cdot N_{CE\text{-}MIB} = 48$ REs can be used to support a partial CE-PBCH repetition 5 1260. If CE-PBCH repetitions are extended in more than two SFs of a frame, additional full repetitions can be realized. Therefore, unlike a mapping of CE-PBCH repetitions to available REs as in FIG. 8, 9A, 9B, or 10, a mapping of CE-PBCH repetitions to available REs in FIG. 12 can support more CE-PBCH repetitions as it does not include barred REs and each quadruplet of OFDM symbols need not include only one CE-PBCH repetition.

Figure 13A:
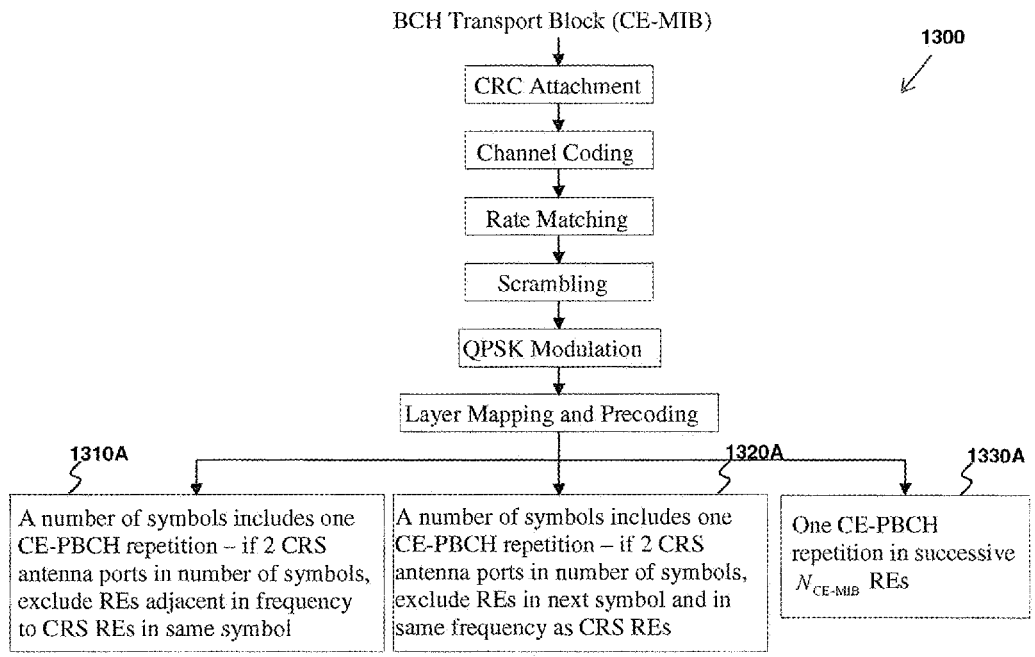
FIG. 13A illustrates a CE-PBCH transmitter according to this disclosure.

FIG. 13A illustrates a CE-PBCH transmitter according to this disclosure. The embodiment of the CE-PBCH transmitter 1300 shown in FIG. 13A is for illustration only. Other embodiments could be used without departing from the scope of the present disclosure.

A CE-PBCH transmitter 1300 includes the same, or similar, processing units as described with respect to FIG. 5 with the exception of the RE mapping unit. For the first mapping approach of this disclosure, eNB 102 transmits a CE-PBCH repetition in the middle 6 RBs of a DL operating BW and in a total of $N_{CE\text{-}MIB}^{symbols}$ OFDM symbols. Each CE-PBCH repetition is either in a quadruplet of OFDM symbols that contain a single, full, CE-PBCH repetition or in less than four OFDM symbols that contain a single, partial, CE-PBCH repetition. A total number of full MTC-PBCH repetitions is $\lfloor N_{CE\text{-}MIB}^{symbols}/4 \rfloor$ and one partial repetition is over $N_{CE\text{-}MIB}^{symbols} - 4 \cdot \lfloor N_{CE\text{-}MIB}^{symbols}/4 \rfloor$ OFDM symbols. If a number of OFDM symbols for a full or partial CE-PBCH repetition includes REs reserved for CRS, REs adjacent in frequency to CRS REs in a same OFDM symbol are excluded from the RE mapping of CE-MIB modulated symbols 1310A (barred REs).

For the second mapping approach of the first embodiment of this disclosure, eNB 102 transmits a CE-PBCH in the middle 6 RBs of a DL operating BW and in a total of $N_{CE\text{-}MIB}^{symbols}$ OFDM symbols. Each CE-PBCH repetition is either in a quadruplet of OFDM symbols that contain a single, full, CE-PBCH repetition or in less than four OFDM symbols that contain a single, partial, CE-PBCH repetition. A total number of full CE-PBCH repetitions is $\lfloor N_{CE\text{-}MIB}^{symbols}/4 \rfloor$ and one partial repetition is over $N_{CE\text{-}MIB}^{symbols} - 4 \cdot \lfloor N_{CE\text{-}MIB}^{symbols}/4 \rfloor$ OFDM symbols. If an OFDM symbol for a full or partial CE-PBCH repetition includes REs reserved for CRS, REs in the OFDM symbol next to the OFDM symbol of CRS REs and in same frequency as CRS REs are excluded from RE mapping of CE-MIB modulated symbols 1320A. Moreover, for a partial repetition, transmitted CE-MIB modulated symbols can include corresponding ones for a full repetition according to whether a respective OFDM symbol includes REs reserved for CRS or are barred. For example, if a partial repetition includes two OFDM symbols wherein only in a first OFDM symbol there are REs reserved for CRS or are barred, CE-MIB modulated symbols in the first OFDM symbol are same as ones for a full repetition in a first OFDM symbol of a quadruplet that includes REs that are reserved for CRS or are barred and CE-MIB modulated symbols in the second OFDM symbol are same as ones for a full repetition in a first OFDM symbol of a quadruplet that does not include REs that are reserved for CRS or are barred.

For the second embodiment of this disclosure, a CE-PBCH is transmitted in the middle 6 RBs of a DL operating BW and in a total of $N_{CE\text{-}MIB}^{symbols}$ OFDM symbols corresponding to a total of $N_{CE\text{-}MIB}^{total}$ REs 1330A. A CE-PBCH is transmitted with a total number of $N_{CE\text{-}MIB}^{repetitions} = \lfloor N_{CE\text{-}MIB}^{total} / N_{CE\text{-}MIB} \rfloor$ full repetitions and with a partial repetition over $N_{CE\text{-}MIB}^{total} - N_{CE\text{-}MIB}^{repetitions} \cdot N_{CE\text{-}MIB}$ REs containing a same number of CE-MIB modulated symbols.

For either of the two embodiments of this disclosure, eNB 102 can puncture a CE-PBCH transmission in a set of REs in order to transmit a CSI-RS in the set of REs.

Even though FIG. 13A considers that CE-PBCH repetitions occur after layer mapping and precoding, they can also occur after QPSK modulation and prior to layer mapping and precoding.

The mapping to REs with frequency index k and OFDM symbol index l that are not reserved for CRS transmission and are not barred from mapping CE-MIB modulated symbols is in increasing order of first the index k, then the index l and finally the frame number. For a CE-PBCH transmission in a set of OFDM symbols $\mathcal{L}$ that includes a total of L OFDM symbols over a frame, the resource element indices are given by $$k = \frac{N_{RB}^{DL} N_{sc}^{RB}}{2} - 36 + k',$$

k'=0, 1, . . . , 71, l=0, 1, . . . , L, l∈$\mathcal{L}$ .

For example, for a FDD system and a transmission of a CE-PBCH segment with repetitions over a frame, $\mathcal{L}$ can include all OFDM symbols in a frame except for a first three OFDM symbols in each SF of a frame that UE 114 assumes to be used for DL control signaling and the last two OFDM symbols of a first slot in a first SF and a sixth SF that UE 114 assumes to be used for PSS/SSS signaling. If the MIB does not convey same information contents as the CE-MIB, a first four OFDM in a second slot of a first SF are also excluded from set $\mathcal{L}$ .

For example, for a TDD system and a transmission of a CE-PBCH segment over a frame, $\mathcal{L}$ can include all OFDM symbols in SF#0, SF#1, SF#5, and SF#6 with same assumptions as for FDD regarding excluded OFDM symbols (due to a presence of DL control signaling or due to a presence of PSS/SSS that are in different OFDM symbols or SFs than in FDD) and with an assumption for a DwPTS length in special SFs such as for example a DwPTS length of 9 OFDM symbols.

Figure 13B:
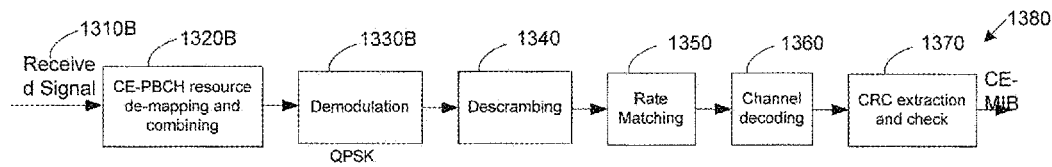
FIG. 13B illustrates a CE-PBCH receiver according to this disclosure.

FIG. 13B illustrates a CE-PBCH receiver according to this disclosure. The embodiment of the CE-PBCH receiver 1380 shown in FIG. 13B is for illustration only. Other embodiments could be used without departing from the scope of the present disclosure.

UE 114 receives a signal 1310B transmitted by eNB 102, a de-mapper 1320B performs de-mapping of resources (REs) that eNB 102 uses to transmit CE-PBCH and a combiner combines repetitions of a CE-PBCH transmission according to the resource mapping of the first or the second approach of the first embodiment or according to the resource mapping of the second embodiment. A demodulator 1330B demodulates CE-PBCH symbols, a descrambler 1340 descrambles the demodulated CE-PBCH symbols followed by a rate matching unit 1350, a channel decoder 1360 and a CRC extraction and check unit 1370. If the CRC check is positive, UE 114 considers that it detected the CE-MIB; otherwise, UE 114 attempts a new CE-PBCH decoding of assumed receptions of CE-PBCH repetitions. The new CE-PBCH decoding can correspond to a different hypothesis for the scrambling code conveying the LSBs of the SFN or can correspond to combined CE-PBCH receptions in multiple successive frames. A CE-PBCH receiver is same as a PBCH receiver but as a PBCH transmission is not repeated and always occurs at a predetermined SF (SF#0), there is no combiner and UE 114 can always assume that a PBCH reception exists.

Power consumption associated with attempts by UE 114 to decode a CE-PBCH when eNB 102 does not transmit a CE-PBCH (in order to reduce an associated CE-PBCH overhead) can be reduced if UE 114 can determine whether or not eNB 102 transmits CE-PBCH in a frame. Moreover, as UE 114 can detect a CE-MIB by hypothesis testing of transmissions of CE-PBCH repetitions over a quadruple of frames, similar to detecting a MIB conveyed by a PBCH over a quadruple of frames, it is beneficial for UE 114 to determine whether there is an actual CE-PBCH transmission in a frame as this can enhance a CE-MIB detection probability. Such determination can be achieved by UE 114 comparing received symbols in time-frequency resources that eNB 102 can use to transmit CE-PBCH repetitions.

The comparison can be enabled, for example, by correlating (multiplying) a received symbol having an index in a first CE-PBCH repetition with a complex conjugate of a received symbol having the same index in a second CE-PBCH repetition in a same frame. A first assumption is that symbols used to transmit a CE-PBCH repetition and have a same index in different repetitions convey same information. A second assumption is that CE-PBCH repetitions in a same frame experience a same DL channel medium implying a channel that is relatively non-selective in the time and frequency domains. The first and second repetitions can be successive ones to minimize any impact of the time selectivity of the DL channel medium.

By averaging correlations over one or multiple pairs of CE-PBCH repetitions and comparing an averaging result to a threshold, UE 114 can determine that eNB 102 transmits a CE-PBCH if the averaging result exceeds the threshold, as the averaging result includes energy and residual averaged noise when eNB 102 actually transmits a CE-PBCH. UE 114 can determine that eNB 102 does not transmit CE-PBCH if the averaging result does not exceed the threshold as the averaging result includes only averaged noise when eNB 102 does not transmit a CE-PBCH. For example, for a CE-PBCH transmission with four repetitions per frame, UE 114 can obtain the averaging result by summing the correlations between the first and second repetitions, the second and third repetitions, and the third and fourth repetitions. Normalization with the number of repetitions or the number of REs conveying CE-MIB modulated symbols in a CE-PBCH repetition, $N_{CE-MIB}$, can also apply. In case the MIB has the same contents as the CE-MIB, including a same CRC, UE 114 can include the PBCH as one of the CE-PBCH repetitions.

Denoting as $N_{CE-MIB}$ a number of REs conveying CE-MIB modulated symbols in a CE-PBCH repetition, for example as in FIG. 8, 9 or 12, it is $N_{CE-MIB}=240$. Denoting by $r_1(n)$ and $r_2(n)$ received symbols in REs for CE-MIB in a first and in a second CE-PBCH repetition in a frame, respectively, where n=0, . . . , $N_{CE-MIB}-1$, UE 114 can determine that eNB 102 transmits a CE-PBCH if $$\sum_{n=0}^{N_{CE-MIB}-1} |r_1(n) \cdot r_2^*(n)|^2 > T$$

where $r^*_2(n)$ is a complex conjugate of $r_2(n)$ and T is a threshold. To improve decision accuracy by UE 114 of whether eNB 102 transmits CE-PBCH, the previous averaging can be extended to multiple pairs of CE-PBCH repetitions in a frame.

Figure 14:
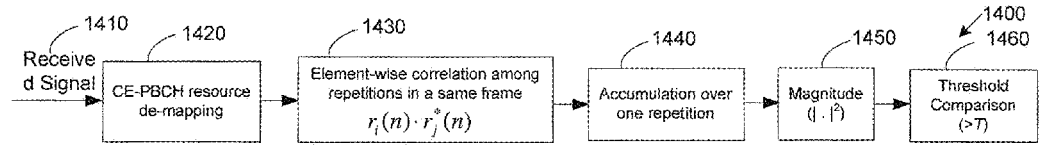
FIG. 14 illustrates a CE-PBCH receiver for determining an existence of a CE-PBCH transmission in a frame according to this disclosure.

FIG. 14 illustrates a CE-PBCH receiver for determining an existence of a CE-PBCH transmission in a frame according to this disclosure. The embodiment of the CE-PBCH receiver 1400 shown in FIG. 14 is for illustration only. Other embodiments could be used without departing from the scope of the present disclosure.

UE 114 receives a signal 1410 in time-frequency resources where eNB 102 can transmit CE-PBCH repetitions. A de-mapper 1420 performs de-mapping of resources (REs) according to the mapping eNB 102 uses to transmit CE-PBCH repetitions in a frame (for example, as described in the second embodiment of this disclosure), a correlator 1430 correlates element n of a CE-PBCH transmission in different repetitions i and j using respective received signals $r_i(n)$ and $r_j(n)$, an accumulator 1440 computes a sum value for the correlation results over all elements of a CE-PBCH repetition, a computing unit 1450 computes a magnitude of the sum value, and a comparator 1460 compares the magnitude to a threshold. The repetitions i and j can be consecutive repetitions. The order of steps 1440 and 1450 can be interchanged. Correlations using additional pairs of CE-PBCH repetitions can also be considered in computing the sum value. Based on the outcome of the comparison in step 1450, UE 114 can determine that CE-PBCH repetitions exist in the frame (input to comparator exceeds the threshold) or do not exist in the frame (input to comparator does not exceed the threshold).

The process described in FIG. 14 can directly apply to any other channel that is transmitted with repetitions without UE 114 knowing whether eNB 102 actually transmits the channel or without UE 114 knowing the starting subframe or frame for the transmission of the channel.

Although the present disclosure has been described with example embodiments, various changes and modifications may be suggested to one skilled in the art. It is intended that the present disclosure encompass such changes and modifications that fall within the scope of the appended claims.

What is claimed is:

1. A method comprising:
   mapping, by a base station, a default broadcast channel and repetitions of the default broadcast channel over subframe (SF) symbols and over a set of sub-carriers (SCs) of a bandwidth, wherein:
      the default broadcast channel is mapped on a first set of SF symbols in a first SF from the set of SFs and on the set of SCs except for SCs used for mapping common reference signals (CRS), and
   a repetition of the default broadcast channel is mapped by copying the mapping of the default broadcast channel on a second set of SF symbols in a second SF from the set of SFs and on the set of SCs and by copying the mapping of the CRS when a SF symbol from the first set of SF symbols includes CRS mapping and a respective SF symbol from the second set of SF symbols does not include CRS mapping; and
   transmitting, by the base station, the default broadcast channel and the repetitions of the default broadcast channel.

2. The method of claim 1, wherein CRS mapping in the SF symbol from the first set of SF symbols includes SCs that are not from the set of SCs and the CRS mapping in the respective SF symbol from the second set of SF symbols includes SCs only from the set of SCs.

3. The method of claim 1, wherein the SF symbols from the set of SFs include all SF symbols except for a predetermined number of SF symbols that can be used for mapping of control channels in the set of SFs and a predetermined number of SF symbols that can be used for mapping of synchronization signals in the set of SFs.

4. The method of claim 1, wherein the set of SFs include two SFs.

5. The method of claim 4, wherein four repetitions exist for the default broadcast channel.

6. A method comprising:
   mapping, by a base station, a default broadcast channel and repetitions for the default broadcast channel in a number of subframe (SF) symbols over one or more SFs and in a number of sub-carriers of a bandwidth, wherein the number of sub-carriers includes a set of sub-carriers the base station uses to map a channel state information reference signal (CSI-RS) in at least one SF symbol from the number of SF symbols; and
   transmitting, by the base station, the default broadcast channel and the repetitions of the default broadcast channel.

7. The method of claim 6, wherein for the set of sub-carriers in the at least one SF symbol from the number of SF symbols, the base station transmits the CSI-RS and punctures the default broadcast channel.

8. The method of claim 6, wherein a first user equipment (UE) that is connected to the base station processes the set of sub-carriers for CSI-RS reception and a second UE that is not connected to the base station processes the set of sub-carriers for default broadcast channel reception.

9. A method comprising:
   receiving, by a user equipment (UE), signaling that the UE assumes to convey repetitions for a default broadcast channel in a number of subframe (SF) symbols over one or more SFs and in a number of sub-carriers of a bandwidth;
   correlating, by the UE, element-wise sub-carriers of a first received signaling corresponding to a first assumed repetition with sub-carriers of a second signaling corresponding to a second assumed repetition;
   accumulating, by the UE, the correlation values to obtain a sum value;
   computing, by the UE, a magnitude of the sum value; and
   determining, by the UE, whether or not repetitions for the default broadcast channel exist in the received signaling depending on whether or not, respectively, the magnitude is larger than a threshold.

10. The method of claim 9, wherein the threshold is determined by the UE.

11. A base station comprising:
    a mapper configured to map a default broadcast channel and repetitions for default broadcast channel over subframe (SF) symbols from a set of SFs and over a set of sub-carriers (SCs) of a bandwidth, wherein:
       the default broadcast channel is mapped on a first set of SF symbols in a first SF from the set of SFs and on the set of SCs except for SCs used for mapping common reference signals (CRS), and
       a repetition of the default broadcast channel is mapped by copying the mapping of the default broadcast channel on a second set of SF symbols in a second SF from the set of SFs and on the set of SCs and by copying the mapping of the CRS when an SF symbol from the first set of SF symbols includes CRS mapping and a respective SF symbol from the second set of SF symbols does not include CRS mapping; and
    a transmitter configured to transmit the default broadcast channel and the repetitions of the default broadcast channel.

12. The base station of claim 11, wherein the CRS mapping in the SF symbol from the first set of SF symbols includes SCs that are not from the set of SCs and the CRS mapping in the respective SF symbol from the second set of SF symbols includes SCs only from the set of SCs.

13. The base station of claim 11, wherein the SF symbols from the set of SFs include all SF symbols except for a predetermined number of SF symbols that can be used for mapping of control channels in the set of SFs and a predetermined number of SF symbols that can be used for mapping of synchronization signals in the set of SFs.

14. A User Equipment (UE) comprising:
a receiver configured to receive a default broadcast channel and repetitions of the default broadcast channel; and
a mapper configured to map the default broadcast channel and the repetitions of the default broadcast channel over subframe (SF) symbols from a set of SFs and over a set of sub-carriers (SCs) of a bandwidth, wherein:
the default broadcast channel is mapped on a first set of SF symbols in a first SF from the set of SFs and on the set of SCs except for SCs used for mapping common reference signals (CRS), and
a repetition of the default broadcast channel is mapped by copying the mapping of the default broadcast channel on a second set of SF symbols in a second SF from the set of SFs and on the set of SCs and by copying the mapping of CRS when a SF symbol from the first set of SF symbols includes CRS mapping and a respective SF symbol from the second set of SF symbols does not include CRS mapping.

15. The UE of claim 14, wherein the CRS mapping in the SF symbol from the first set of SF symbols includes SCs that are not from the set of SCs and the CRS mapping in the respective SF symbol from the second set of SF symbols includes REs only from the set of SCs.

16. The UE of claim 14, wherein the SF symbols from the set of SFs include all SF symbols except for a predetermined number of SF symbols that can be used for mapping of control channels in set of SFs and a predetermined number of SF symbols that can be used for mapping of synchronization signals in the set of SFs.

17. A base station comprising:
a mapper configured to map a default broadcast channel and repetitions for the default broadcast channel in a number of subframe (SF) symbols over one or more SFs and in a number of sub-carriers of a bandwidth, wherein the number of sub-carriers includes a set of sub-carriers the base station also uses to map a channel state information reference signal (CSI-RS) in at least one SF symbol from the number of SF symbols;
a transmitter configured to transmit the default broadcast channel and the repetitions of the default broadcast channel.

18. The base station of claim 17, wherein for the set of sub-carriers in the at least one SF symbol from the number of SF symbols, the base station transmits the CSI-RS and punctures the default broadcast channel.

19. A user equipment (UE) comprising:
a receiver configured to receive signaling that the UE assumes to convey repetitions for a default broadcast channel in a number of subframe (SF) symbols over one or more SFs and in a number of sub-carriers of a bandwidth;
a correlator configured to element-wise correlate sub-carriers of a first received signaling corresponding to a first assumed repetition with sub-carriers of a second signaling corresponding to a second assumed repetition;
an accumulator configured to accumulate the correlation values to obtain a sum value;
a computing unit configured to compute a magnitude for the sum value; and
a decision unit configured to decide whether or not repetitions for the default broadcast channel exist in the received signaling depending on whether or not, respectively, the magnitude is larger than a threshold.

20. The UE of claim 19, wherein the threshold is determined by the UE.

* * * * *